United States Patent [19]
Wroblewski et al.

[11] Patent Number: 5,339,391
[45] Date of Patent: Aug. 16, 1994

[54] COMPUTER DISPLAY UNIT WITH ATTRIBUTE ENHANCED SCROLL BAR

[75] Inventors: David A. Wroblewski, Austin, Tex.; William C. Hill, Montville, N.J.; Timothy P. McCandless, Austin, Tex.

[73] Assignee: Microelectronics And Computer Technology Corporation, Austin, Tex.

[21] Appl. No.: 102,021

[22] Filed: Aug. 4, 1993

Related U.S. Application Data

[63] Continuation of Ser. No. 523,117, May 14, 1990, abandoned.

[51] Int. Cl.$^5$ .......................................... G06F 15/62
[52] U.S. Cl. ................................... 395/157; 345/123
[58] Field of Search ............................. 395/155–161, 395/133; 345/121, 123–125, 127, 129, 134, 119, 118; 364/401, 423; 368/41

[56] References Cited

U.S. PATENT DOCUMENTS

| | | | |
|---|---|---|---|
| 4,831,556 | 5/1989 | Oono | 395/157 |
| 4,852,042 | 7/1989 | Zur Muhlen et al. | 364/401 |
| 4,881,179 | 11/1989 | Vincent | 395/161 X |
| 4,962,473 | 10/1990 | Crain | 364/423 |
| 4,975,690 | 12/1990 | Torres | 345/119 |
| 5,001,697 | 3/1991 | Torres | 394/157 X |
| 5,023,851 | 6/1991 | Murray et al. | 368/41 |
| 5,039,937 | 8/1991 | Mandt et al. | 395/161 X |
| 5,095,448 | 3/1992 | Obuchi et al. | 395/155 X |
| 5,129,057 | 7/1992 | Strope et al. | 395/161 |

OTHER PUBLICATIONS

"Foss, Tools for Reading and Browsing Hypertext", Information Processing and Management, pp. 407–418, 1989.
GrandView Reference Guide, Symantec Corp., 1988, pp. 121–124.
Linton et al, "Composing User Interfaces with Interviews", IEEE, 1989, pp. 8–22.
Olsen, D., "Mike: The Menu Interaction Kontrol Environment", Oct. 1986, pp. 318–344.
Linton et al, "Composing user Interfaces with Interviews", Feb. 1989, Computer, pp. 8–22.
Lampson, "Personal Distributed Computing: The Alto And Ethernet Software," A History of Personal Workstations, ed., Adele Goldberg, ACM Press, New York, N.Y., 1988, pp. 315–323.
Card et al., "The Psychology of Human–Computer Interaction," Lawrence Erlbaum Associates, Hillsdale, N.J., 1983, pp. 216–221.
Augarten et al., "The NeXT User's Reference Manual", NeXT, Inc., 1989, pp. 44–48.
Johnson et al., "The Xerox Star: A Retrospective," Computer, Sept. 1989, pp. 11–29.
Goldberg, "Smalltalk–The Interactive Programming Environment," Addison–Wesley Publishing Co., Reading, Mass., 1984, pp. 11–13, 26–28, 37–41, 46–48, 56, and 108–110.
Salvendy, "Handbook of Human Factors," John Wiley & Sons, New York, 1987, pp. 1526–1541.
Roberts, "Evaluation of Computer Text Editors," Report SSL-79-9, Xerox Applied Information–Processing Psychology Project, Systems, Sciences Laboratory, Palo Alto Research Center, Palo Alto, Calif., 1979, pp. 1–184.
Olsen Jr., "Bookmarks: An Enhanced Scroll Bar," *ACM Transactions on Graphics*, vol. 11, No. 3, Jul. 1992, pp. 291–295.

*Primary Examiner*—Heather R. Herndon
*Assistant Examiner*—John E. Breene
*Attorney, Agent, or Firm*—David M. Sigmond

[57] ABSTRACT

An attribute-enhanced scroll bar is graphically displayed. A selected portion of a stored data file, for example a document, is displayed in a display field, and a scroll bar field including a scroll bar is used to indicate the position of the displayed portion relative to the entire data file. In addition, maps of significant task-specific attributes of the data file, for example particular character strings within a document, are displayed in the scroll bar field of the display along with the scroll bar. The attribute maps indicate the location of the significant attributes within the data file. In addition, the attributes are highlighted within the portion of the data file that is displayed in the display field.

34 Claims, 4 Drawing Sheets

Fig. 1

COMPUTER DISPLAY UNIT WITH ATTRIBUTE ENHANCED SCROLL BAR

CROSS-REFERENCE TO RELATED APPLICATIONS

This is a continuation of U.S. application Ser. No. 07/523,117 filed May 14, 1990, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The invention generally relates to computer displays and methods of operating computer displays and, more particularly, to displays including a data display region used to display a portion of a stored data file, and a scroll bar display region used to display a scroll bar and to display locations of significant data attributes within the stored data file.

Presently, scroll bars occupy a scroll bar display region or window and allocate a long rectangle of pixels, typically called a shaft, to represent the extent of a stored data file, for example a document. Such scroll bars provide one car, which is a colored or shaded sub-rectangle located within the shaft, and which corresponds to the portion of the data file which is presently being displayed in a data display region or field of the display screen. When the car is moved through the shaft, the data display field is updated to display the data file contents corresponding to the new position of the car. Thus, ordinary scroll bars indicate a single feature of the display, i.e., which portion of the data file is presently being displayed. Other than the relative length of the entire data file, represented by the relative sizes of the shaft and car, no other file-specific information is displayed.

SUMMARY OF THE INVENTION

The present invention significantly extends the function of scroll bars by superimposing a map of the positions of significant attributes within a stored data file in the scroll bar field of the display screen, while simultaneously highlighting those significant attributes in the visible portion of the data file. The attribute maps are displayed in addition to the scroll bar. The significant attribute maps are displayed in the scroll bar field by putting appropriate regions of the scroll bar shaft in a contrasting color or shade, which serves to draw a user's attention.

With the attribute enhanced scroll bar of the present invention, a user can determine the distribution of significant attributes in the space defined by the stored data file, and can determine the existence of significant data attributes outside of the visible portion of the data file presently being displayed in the data display field of the screen.

Examples of significant data attributes include words or phrases within a document, and information about the time of character input, time of editing, an indication of the document author, or any other document specific information. In addition, the attribute-enhanced scroll bar of the present invention can be displayed independent of the underlying data file, and will serve to recall attributes of the file, the state of the task for which the file exists, and will allow the file to be easily opened to a desired place.

As a result, significant task-specific attributes of the data file being displayed are visually indexed against a scroll bar, which allows users to navigate easily through the file.

BRIEF DESCRIPTION OF THE DRAWINGS

FIG. 1 is an illustration of a display screen with an attribute-enhanced scroll bar according to the present invention;

DETAILED DESCRIPTION OF THE PREFERRED EMBODIMENTS

Figure 1:
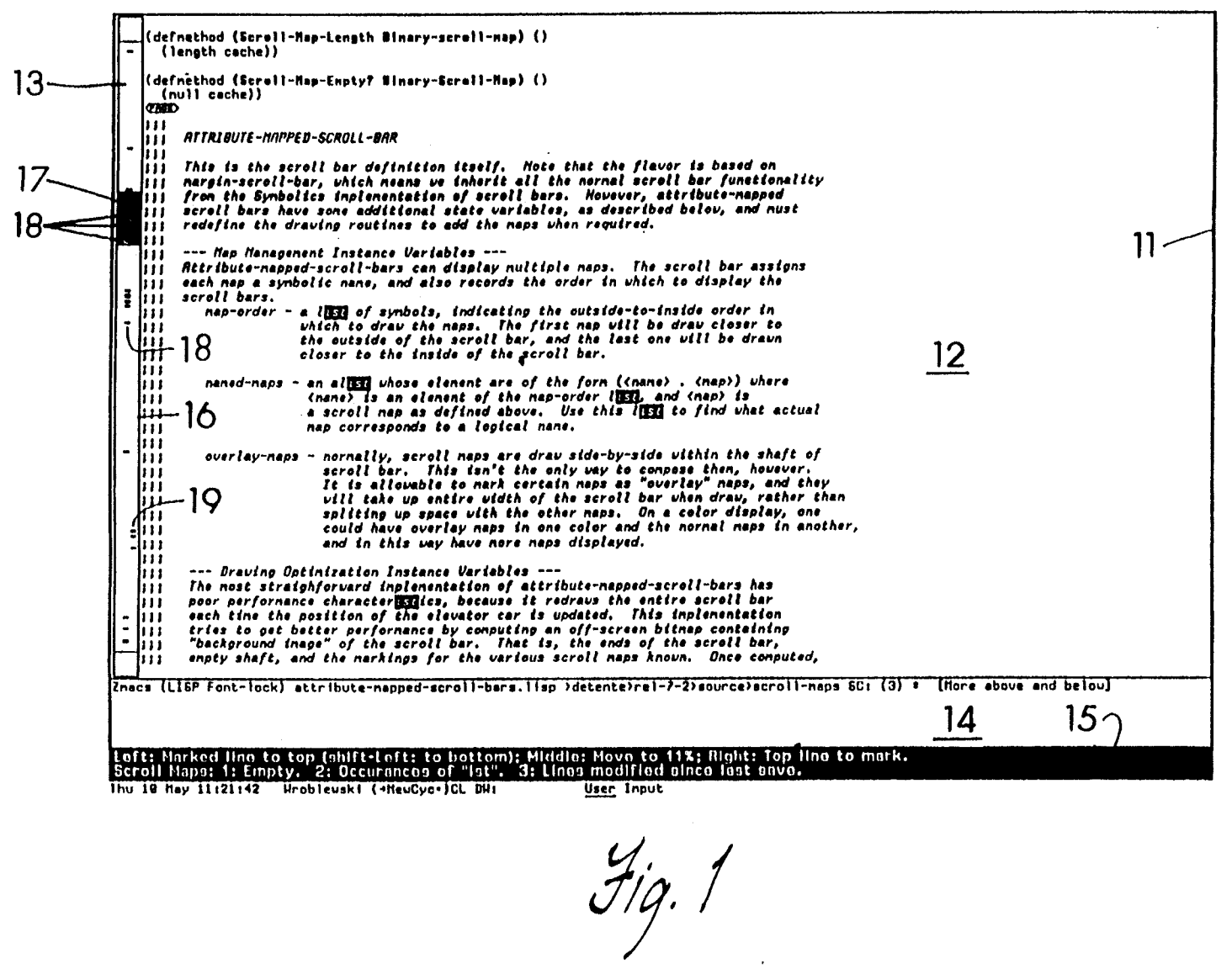
Figure 3:
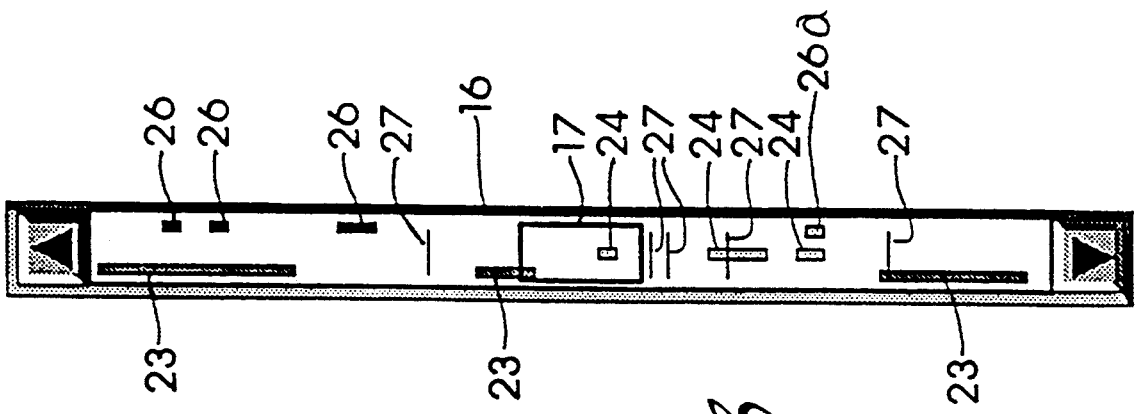
FIG. 3 is a more detailed illustration of an attribute-enhanced scroll bar according to the present invention wherein different attributes are simultaneously displayed.

Referring to FIG. 1, a computer display screen is shown illustrating an embodiment of the present invention. Display screen 11 is divided into several display fields or windows 12, 13, 14 and 15.

Display field 12 is used to display a selected portion of a stored data file, for example, a document. The file used for illustrative purposes in FIG. 1 is a computer program. Display fields 14 and 15 can be used, for example, to display identifying data relating to the data file being displayed, type fonts, and format data such as margins, tabs, and the like.

Display field 13 is an attribute-enhanced scroll bar according to the present invention. Display field 13 includes a substantially rectangular region, or shaft 16, and a shaded rectangular region, or car 17. The length of shaft 16 is representative of the length of the data file, a portion of which is displayed in field 12. The position of car 17 within shaft 16 is indicative of the position of the portion of the data file displayed in field 12 relative to the entire length of the data file. Thus, in FIG. 1, the spatial relationship between and relative sizes of shaft 16 and car 17 indicate that the portion of the data file displayed in display field 12 is the fourth page of a 13-page document. In addition, the size of car 17 relative to shaft 16 is indicative of the length of the page displayed in field 12 relative to the length of the entire data file.

Also displayed in shaft 16 are attribute maps including indicia 18 and 19. Attribute indicia 18 and 19 indicate the position of significant attributes within the data file represented by shaft 16. In FIG. 1, three attribute maps are displayed within shaft 16. The first attribute map is empty, and no indicia therefor are included in shaft 16. The second attribute map includes indicia 18, and in the illustration of FIG. 1, indicates the locations of the character string "ist" within the data file represented by shaft 16. Also displayed is a third attribute map which includes single indicium 19. In the example of FIG. 1, the third attribute map indicates the location of the lines within the data file represented by shaft 16 which were changed since the last time the data file was saved.

In addition to displaying attribute maps within shaft 16, the individual attributes are simultaneously highlighted within the portion of the data file displayed in field 12. In the example of FIG. 1, the character string "ist" occurs three times in the portion displayed in field 12, the occurrences of which correspond to the three indicia 18 contained within car 17. The vertical positions of indicia 18 within car 17 correspond to the vertical positions of the character strings highlighted in the portion of the data file displayed in field 12.

Included in display field 15 is a data field identifying the three scroll maps appearing in shaft 16.

It should be emphasized that more or less than three scroll maps can be included within shaft 16, and that different types of indicia can be used to indicate the location of the mapped data attributes. For example, different shades or colors can be used within a scroll map to identify different types of data within a given map. Then, if a stored document is authored by several different authors, the indicia in a corresponding attribute map could have a different color, or gray shade, assigned to each different author. Another example would be to assign different gray shades or colors to different times of editorial revisions of the data file. Portions of the data file recently added or edited would result in indicia of one shade or color while editorial editions or revisions of later vintage would bear different shades or colors throughout the spectrum.

Figure 2:
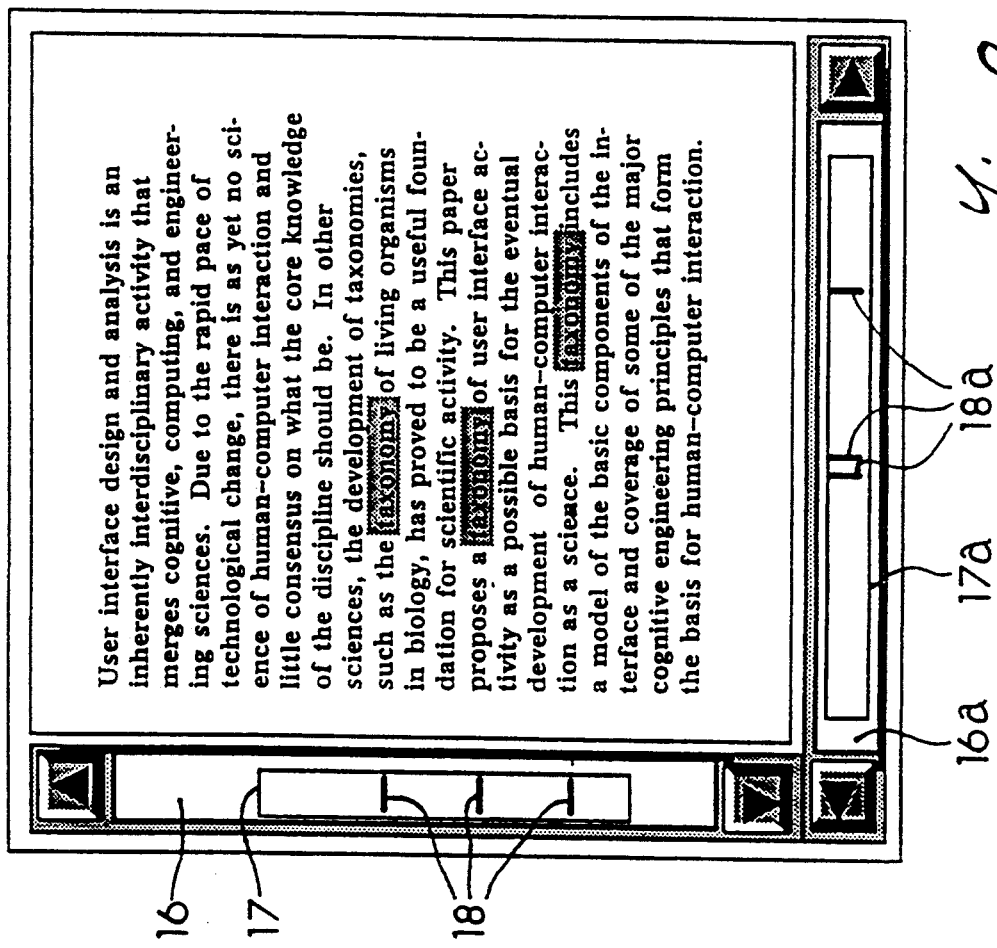
FIG. 2 is an illustration of a display screen with two attribute-enhanced scroll bars according to another embodiment of the present invention.

In addition, as illustrated in FIG. 2, more than one scroll bar field can be included, for example, a vertical scroll bar field including shaft 16 and car 17, and a horizontal scroll bar field including shaft 16a and car 17a. As in FIG. 1, the position of car 17 relative to shaft 16 indicates the vertical position within the data file of the portion displayed in field 12, and the vertical positions of the indicia of the attribute maps within shaft 16 indicate the vertical location of the relevant data attributes within the displayed file. Similarly, the position of car 17a within shaft 16a indicates the horizontal position within the data file of the portion displayed in field 12, and the horizontal positions of the indicia of the attribute maps within shaft 16a indicate the horizontal location of the relevant attributes within the displayed file.

FIG. 3 illustrates an enhanced scroll bar according to the present invention including four attribute maps. Shaft 16 includes car 17 and they function together as described above. The first attribute map includes indicia 23, the second attribute map includes indicia 24, the third attribute map includes indicia 26 and 26a, and the fourth attribute map includes indicia 27. As above, the positions of the respective indicia along shaft 16 are indicative of the positions of the relevant attributes within the data file represented by the length of shaft 16. As shown, the colors or shades used for the indicia can change from map to map, as illustrated by indicia 23, 24 and 26, and the colors or shades of the indicia can change within a single map, as illustrated by indicia 26 and 26a. In addition, the shape of the indicia can change as is illustrated by the rectangular shapes of indicia 23, 24 and 26, and the line-shape of indicia 27. Line-shaped indicia 27 can be used, for example, to indicate the separations between different sections or chapters of a document. Thus, the different shapes, sizes, shades and/or colors of the attribute indicia can be used to distinguish different attribute maps, or to distinguish attributes within the same map, or both.

FIG. 3 illustrates how a significant amount of information can be obtained about a data file by viewing the featural representation of the data file offered by the enhanced scroll bar alone.

Figure 4:
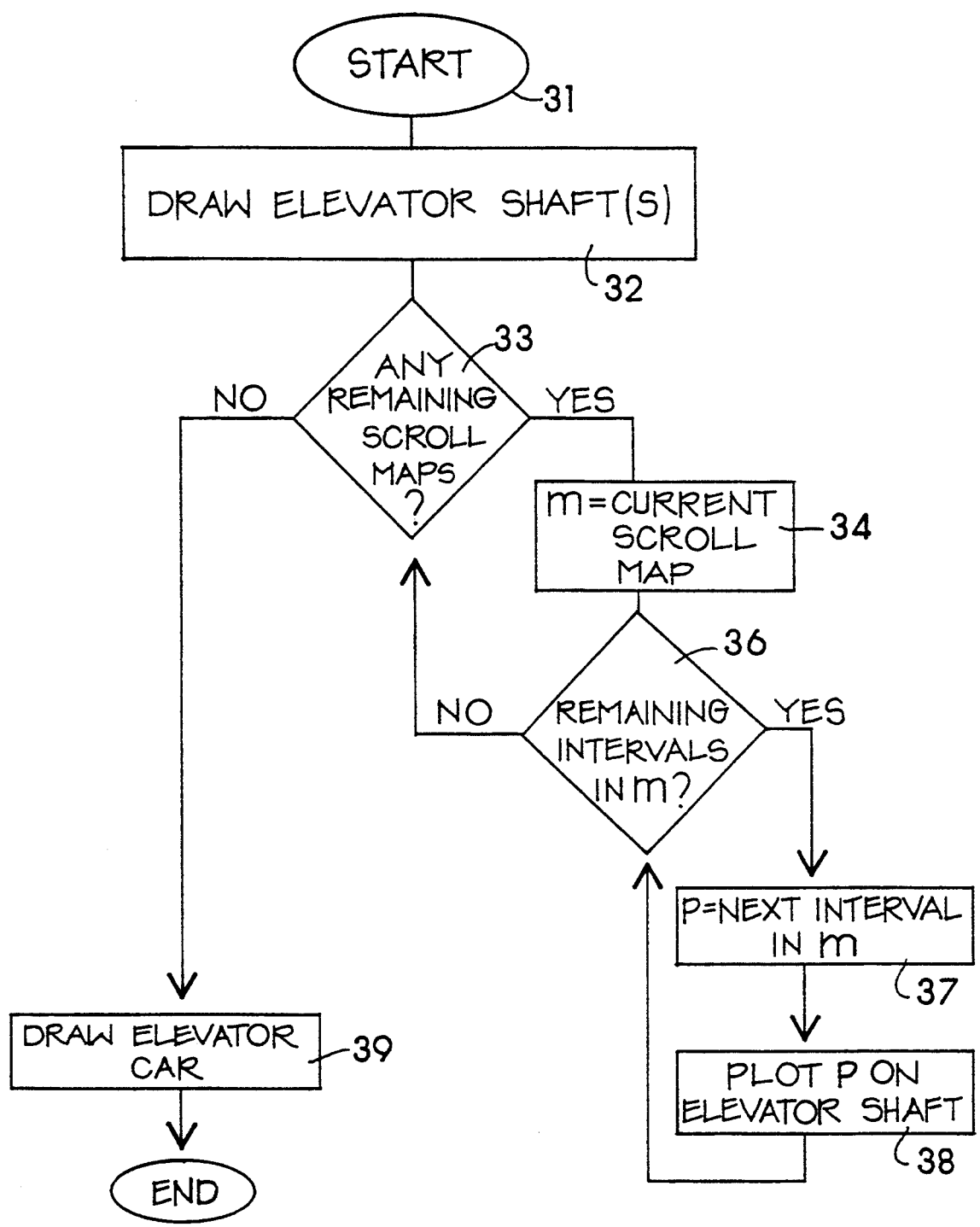
FIG. 4 is a flow diagram illustrating the operation of the invention.

FIG. 4 shows the flow diagram of the present invention. Initially, at the beginning of the process indicated by start block 31, the elevator shaft or shafts for the scroll bar field are drawn on the screen in block 32. Then, in decision block 33, it is determined whether any scroll maps remain to be formatted and displayed. If so, the number of the scroll map is determined in block 34, and the intervals (i.e., start point and end point) of the desired attribute within the relevant scroll map are determined and plotted in the loop including decision block 36 and operation blocks 37 and 38.

In decision block 36, it is determined whether any intervals remain to be plotted in the particular map under consideration. If so, operation block 37 determines the next interval within the map, and block 38 plots that interval on the shaft.

When decision block 36 determines that the last interval within a particular map has been plotted, control is returned to decision block 33 where it is determined whether additional scroll maps remain to be plotted.

Once all scroll maps have been plotted, control is transferred to block 39 where the car or cars are drawn within the shaft. The procedure is then terminated.

Figure 5:
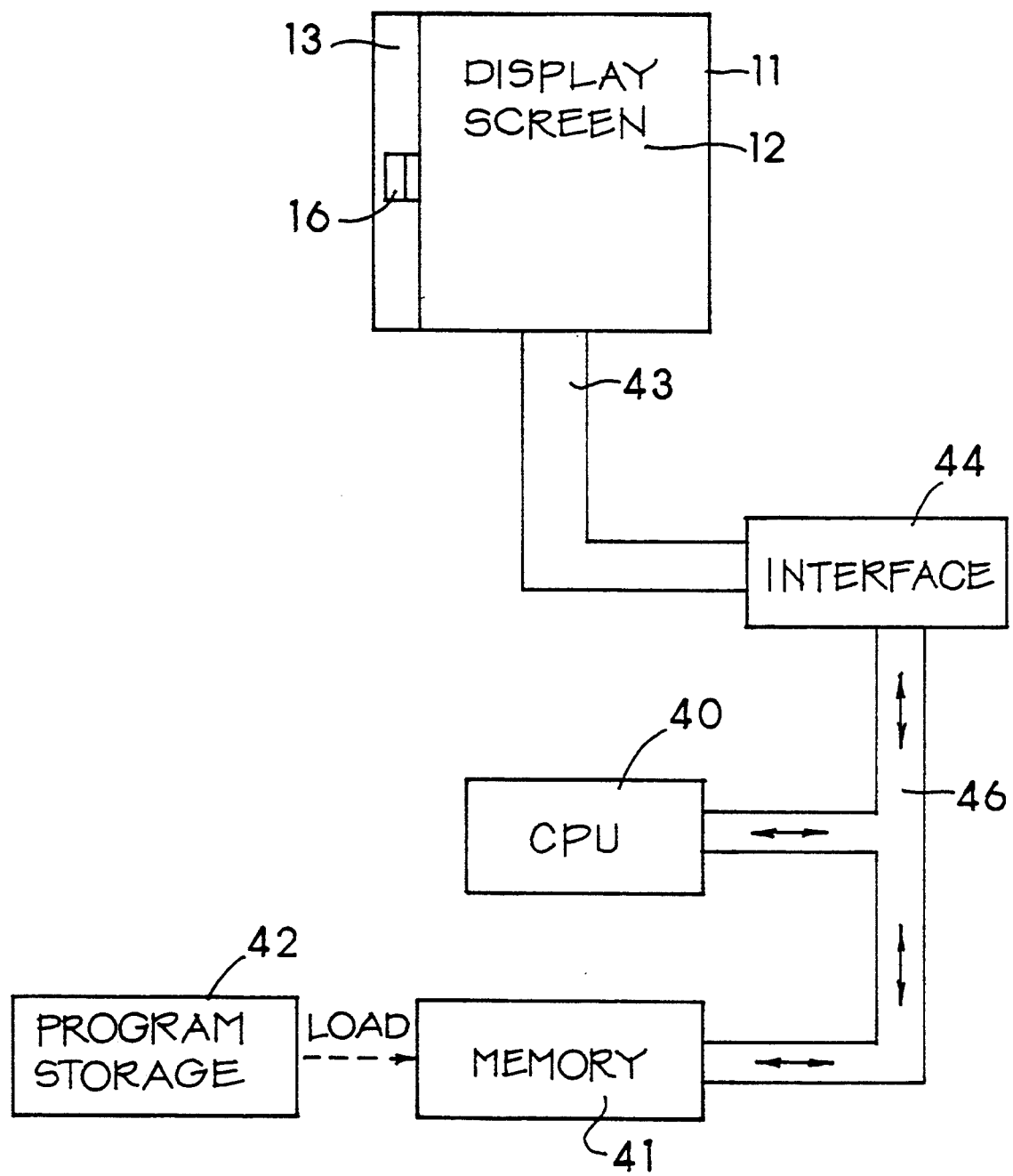
FIG. 5 is a diagram of a computer system illustrating use of the attribute-enhanced scroll bar of the present invention.

Referring to FIG. 5, to use the attribute enhanced scroll bar of the present invention, a computer system, which includes a central processing unit (CPU) 40, first loads the enhanced scroll bar algorithm of the present invention into memory 41 from program storage medium 42. The enhanced scroll bar algorithm is diagrammed in FIG. 4, and is shown in detail in the program listing below. Program storage medium 42 can be any machine readable storage medium such as, for example, a floppy or hard magnetic or optical disk, or a programmable read-only memory. Display 11, including data display field 12 and scroll bar field 13, is connected in a known manner through display control bus 43, display interface 44 and internal data/address bus 46 to CPU 40.

The computer system can be any suitable computer and hardware display, preferably capable of displaying bit mapped graphics. In the preferred embodiment, the Symbolics 3600-family computers in the Genera software environment are used. These work stations are publicly available from the Symbolics Corporation.

However, it will be understood that the particular hardware used can be of any type. Virtually any work station in the computer marketplace which bundles software for window-based interfaces, or which has independent vendors of such software, would be acceptable. For example, acceptable alternatives include computer systems manufactured by IBM, all IBM PC compatibles, Apple MacIntosh, Microsoft, NeXt, DEC, Sun Microsystems, and others.

The foregoing description of the invention has been directed to a particular preferred embodiment for purposes of explanation and illustration. It will be apparent, however, to those skilled in this art that many modifications, additions and deletions may be made without departing from the essence of the invention. It is the applicants' intention in the following claims to cover all equivalent modifications and variations as fall within the scope of the invention.

The enhanced scroll bar routine of the present invention is shown in the program listing that follows. The program is written in LISP language for the Symbolics 3600-family computers in the Genera software environment. Versions for other computers are readily producible by practitioners skilled in the art.

```lisp
;;; -*- Mode: LISP; Syntax: Common-lisp; Package: DYNAMIC-WINDOWS; Base: 10; -*-
;;;
;;; ****************************************************************
;;;
;;; Copyright 1990 Microelectronics And Computer Technology Corporation.
;;; All Rights Reserved.
;;;
;;; Shareholders of MCC may reproduce and distribute this material for
;;; internal purposes by retaining MCC's copyright notice and proprietary
;;; legends and markings on all complete and partial copies.
;;;
;;; ACA Confidential and Proprietary.
;;;
;;; This file defines the a structure called a "map" and a new kind of scroll bar
;;; that highlights the intervals of the map inside the normal image of a scroll bar.
;;;
;;; The map is defined by the flavor basic-scroll-map. The most common use
;;; of maps will be the flavor binary-scroll-map, which defines a set of intervals
;;; over which some attribute is considered to have the binary value "1"; all
;;; other intervals are considered to have the binary value "0". The map does not
;;; commit to the meaning of the intervals, so the implementation could be used
;;; for many things, such as finding the hits in the textual search of a buffer,
;;; or for finding the important regions in a display of geographic information.
;;;
;;; The scroll bar is defined as flavor attribute-mapped-scroll-bar.
;;; It is based on the flavor margin-scroll-bar, defined by Symbolics,
;;; and only adds the additional functionality needed to overlay the
;;; maps on the normal scroll bar. For the scroll bar drawing
;;; routines, this required an extensive rewrite because the image the
;;; scroll bar shaft can now be more expensive to compute than an
;;; ordinary scroll bar; therefore we cache the bit-image offscreen and
;;; recompute it only when neccesary.
;;;
;;; ****************************************************************
;;;
(defvar *White-Pattern* (tv:make-gray 2 2 #o00 #o00))
(defvar *Black-Pattern* (tv:make-gray 2 2 #o11 #o11)).
;;;
;;; These scroll bars will look at these variables to see how they should fill their parts.
;;;
(defvar *Elevator-Car-Gray*      tv:33%-gray)
(defvar *Elevator-shaft-gray*    *white-pattern*)
(defvar *Elevator-End-Gray*      *white-pattern*)
;;;
;;; BASIC-SCROLL-MAP
;;; The base flavor off of which all scroll map flavors ought to be built.
;;; This is an abstract flavor and should not be instantiated.
;;;
(defflavor Basic-Scroll-Map
     ()
     ())
;;;
;;; BINARY-SCROLL-MAP
;;;
;;; This structure represents a map of intervals in a document.
;;; Intervals represented pass some threshold of interest in some along
;;; some feature, although it doesn't matter that that feature is.
;;; These maps are "binary" because they don't allow for degreees of
;;; strength in each interval. Each interval is 100% "on", each area
;;; not included in an interval is 100% "off". Clients of this
;;; structure only know that they can ask to map over each interval in
;;; turn and do something. They do not know whether it is computed on
;;; the fly or precomputed and cached (which it is usually).
;;;
;;; The representation of intervals stored in a map is defined by the
;;; creator of the map, who supplies a function to retrieve the
;;; start-point and end-point for each element in the set of intervals.
;;; For instance, the degenerate case is where each interval is
;;; represented by a single number, and the accessor for the start and
;;; end points is #'identity. Another representation might use a
;;; dotted pair to represent the interval, and the accessors would be
;;; #'car and #'cdr. Still another might use ZWEI datastructure to
;;; represent the intervals.
;;;
;;; Consumers of a map are allowed to apply a function to each of the
;;; intervals in the map. The function (MAP-SCROLL-MAP <map> <function>)
;;; applies <function> to each interval in <map>. <function> should
;;; take three arguments: (1) the interval datastructure itself (2)
;;; the start point, and (3) the end point.
;;;
;;; One of these is given to scroll bars so they know where the
;;; interesting points in the document are.
;;;
```

```
;;; The functions that can be called on scroll maps are:
;;;
;;; MAKE-INSTANCE - normal flavor object maker, allows the following
;;; init keywords.
;;;    :CACHE  The values to store in the map. This is a list of datastructures
;;;        representing intervals, whose actual implementation is up to
;;;        the caller.
;;;    :STARTPOINT-ACCESSOR  A function to apply to members of the cache to
;;;        get the startpoint of the interval.
;;;    :ENDPOINT-ACCESSOR  A function to apply to members of the cache to
;;;        get the endpoint of the interval.
;;;    :PRINTABLE-KEY  A string that can be printed indicating the contents
;;;        of the map. This is reflected in the mouse documentation line.
;;;
;;; MAP-SCROLL-MAP scroll-map function
;;;    Applies <function> (a 3-arg function) to each point in the
;;;    scroll map. <function> takes the interval, its startpoint, and
;;;    its endpoint as argument. Its return value is ignored.
;;;
;;; SCROLL-MAP-LENGTH scroll-map
;;;    Returns an integer.
;;;
;;; SCROLL-MAP-PRINTABLE-KEY scroll-map
;;;    Returns a string, or NIL if no printable key is available.
;;;
;;;
(defflavor Binary-Scroll-Map
    ((cache              nil)
     (startpoint-accessor #'identity)
     (endpoint-accessor   #'identity)
     (printable-key      nil))
    (basic-scroll-map)
  :initable-instance-variables
  :readable-instance-variables
  :writable-instance-variables
  (:conc-name "SCROLL-MAP-"))

(defmethod (Map-scroll-map Binary-scroll-map) (function)
  (dolist (interval cache)
    (funcall function interval (funcall startpoint-accessor interval) (funcall endpoint-accessor interval
))))

(defmethod (Scroll-Map-Length Binary-scroll-map) ()
  (length cache))

(defmethod (Scroll-Map-Empty? Binary-Scroll-Map) ()
  (null cache))

;;;
;;; ATTRIBUTE-MAPPED-SCROLL-BAR
;;;
;;; This is the scroll bar definition itself. Note that the flavor is based on
;;; margin-scroll-bar, which means we inherit all the normal scroll bar functionality
;;; from the Symbolics implementation of scroll bars. However, attribute-mapped
;;; scroll bars have some additional state variables, as described below, and must
;;; redefine the drawing routines to add the maps when required.
;;;
;;; --- Map Management Instance Variables ---
;;; Attribute-mapped-scroll-bars can display multiple maps. The scroll bar assigns
;;; each map a symbolic name, and also records the order in which to display the
;;; scroll bars.
;;;    map-order - a list of symbols, indicating the outside-to-inside order in
;;;                which to draw the maps. The first map will be draw closer to
;;;                the outside of the scroll bar, and the last one will be drawn
;;;                closer to the inside of the scroll bar.
;;;
;;;    named-maps - an alist whose element are of the form (<name> . <map>) where
;;;                <name> is an element of the map-order list, and <map> is
;;;                a scroll map as defined above. Use this list to find what actual
;;;                map corresponds to a logical name.
;;;
;;;    overlay-maps - normally, scroll maps are draw side-by-side within the shaft of
;;;                scroll bar. This isn't the only way to compose them, however.
;;;                It is allowable to mark certain maps as "overlay" maps, and they
;;;                will take up entire width of the scroll bar when draw, rather than
;;;                spliting up space with the other maps. On a color display, one
;;;                could have overlay maps in one color and the normal maps in another,
;;;                and in this way have more maps displayed.
;;;
;;;    --- Drawing Optimization Instance Variables ---
;;; The most straighforward implementation of attribute-mapped-scroll-bars has
;;; poor performance characteristics, because it redraws the entire scroll bar
;;; each time the position of the elevator car is updated. This implementation
;;; tries to get better performance by computing an off-screen bitmap containing
;;; "background image" of the scroll bar. That is, the ends of the scroll bar,
;;; empty shaft, and the markings for the various scroll maps known. Once computed,
;;; the background image can be periodically updated when free cycles are available.
;;; The scroll bar is draw by first bitblt-ing the background image onto the screen,
```

```
;;;     then superimposing the elevator car rectangle onto that image.  If the scroll
;;;     has already been drawn, only the car needs to move, then we erase the elevator
;;;     car (by bitblting the appropriate subrectangle of the background image back onto
;;;     the screen) and redraw the elevator car in the new position.
;;;
;;;          image-tick - a boolean, indicating whether the contents of the image-cache
;;;                       are out of date, and should be recomputed.
;;;
;;;          image-cache - the off-screen bitmap containing the image of the elevator shaft,
;;;                        the elevator ends, and the scroll maps associated with the
;;;                        scroll bar.  This can be marked as invalid by setting the
;;;                        image-tick instance variable to T.
;;;
(Defflavor Attribute-Mapped-Scroll-Bar
           ((map-order         nil)
            (named-maps        nil)
            (overlayed-maps    nil)
            (image-tick        t)
            (image-cache       nil))
           (margin-scroll-bar)
  :initable-instance-variables
  :readable-instance-variables
  )

(Defmethod (Get-Named-Scroll-Map Attribute-Mapped-Scroll-Bar) (Name &Optional (Default Nil))
  ;; Returns the scroll map indicated or the default value.
  ;; <name> is typically a keyword symbol.
  (Scl:Getf Named-Maps Name Default))

(Defmethod (Set-Named-Scroll-Map Attribute-Mapped-Scroll-Bar) (Name Map &Optional (Error-If-Unknown-Name
T))
  ;; Sets the scroll bar map named <name> to be the new map.
  (Unless (Or (Member Name Map-Order) (Null Map))
     (If Error-If-Unknown-Name
         (Error "The map named ~s is not defined in this scroll bar." Name)
         (Setf Map-Order (Nconc Map-Order (List Name)))))
  (Setf (Scl:Getf Named-Maps Name) Map))

(Defmethod (Set-Map-Order Attribute-Mapped-Scroll-Bar) (List-Of-Map-Names)
  ;; Sets the order of maps to those indicated.
  ;; Each element of list-of-map-names can be either a symbol or a list of the form (:overlay <symbol>).
  ;; This initializes the variables overlay-maps and map-order.
  (Setf Overlayed-Maps Nil)
  (Mapcar #'(Lambda (E) (When (Listp E) (Push (Second E) Overlayed-Maps))) List-Of-Map-Names)
  (Setf Map-Order (Mapcar #'(Lambda (E) (If (Atom E) E (Second E))) List-Of-Map-Names)))

(Defmethod (Get-Map-Order Attribute-Mapped-Scroll-Bar) ()
  ;; Returns the order of displayed maps.
  (Copy-List Map-Order))

(defmethod (Ensure-Image-Cache Attribute-mapped-scroll-bar) ()
  ;; This makes sure the image-cache state variable is filled with an appropriate bit array.
  ;; Sometimes this gets called when window-range is NIL.  Then it should do nothing...
  (When Window-Range
    (Labels (($Image-Cache-Dims (Height)
               (Ecase Scroll-Bar-Margin
                 ((:Left :Right) (Values Height (Tv:Round-Up Elevator-Thickness 32)))
                 ((:Top :Bottom) (Values Elevator-Thickness (Tv:Round-Up Height 32))))))
      (Or Image-Cache
          (Multiple-Value-Bind (D1 D2) ($Image-Cache-Dims (Range-Size Window-Range))
            (Setf Image-Cache (Make-Array (List D1 D2) :Element-Type 'Bit)))))))

(defmethod (Orientation Attribute-mapped-scroll-bar) ()
  ;; Returns :horizontal or :vertical
  (cond ((member (scroll-bar-margin) '(:left :right)) :vertical)
        ((member (scroll-bar-margin) '(:top :bottom)) :horizontal)))

(Defmethod (Draw-Scroll-Map-In-Band Attribute-mapped-scroll-bar) (Map Avail-Range Array
                                                                  Band-Start Band-End &optional (alu
tv:alu-seta))
  (Let* ((Bar-Top      Elevator-Thickness)          ; start of shaft proper past end targets
         (Bar-Bottom   (- (- (Range-Max Window-Range) (Range-Min Window-Range)) Elevator-Thickness))
         (Bar-Length   (- Bar-Bottom Bar-Top))
         (F            (/ Bar-Length Avail-Range))
         (Orientation  (Orientation Self)))
    (Map-Scroll-Map
      Map
      #'(Lambda (Interval Startpoint Endpoint)
          (Declare (Ignore Interval))
          (Let ((Start-Line (max bar-top (+ (Floor (* Startpoint F)) Bar-Top)))
                (End-Line   (min bar-bottom (+ (Ceiling (* Endpoint F)) Bar-Top))))
            (Loop For I From Start-Line To End-Line Do
              (Ecase Orientation
                (:Vertical   (Tv:%Draw-Line Band-Start I Band-End I Alu T Array))
                (:Horizontal (Tv:%Draw-Line I Band-Start I Band-End Alu T Array)))))))))
```

```
(defvar *Map-Spacing* 1)

(defun Compute-Map-Width (elevator-width number-of-maps)
  ;; Given a width for the elevator, and the number of maps to display, this
  ;; function computes the pixel-width that each attribute map will occupy.
  ;; It returns an integer.
  (setf elevator-width (- elevator-width 2)) ; subtract off outer edges.
  (floor (- elevator-width (* (1+ number-of-maps) *map-spacing*)) number-of-maps))

(defmethod (Draw-Scroll-Maps-On-Array Attribute-mapped-scroll-bar) (avail-range array &optional (alu tv:alu-seta))
  (declare (ignore alu))
  (let ((n-split-maps (- (length map-order) (length overlayed-maps)))) ;number of maps to split space among...
    (cond ((zerop n-split-maps)
           ;; All the maps are overlays
           (loop for m in map-order
                 for real-map = (get-named-scroll-map self m)
                 when real-map
                   do (draw-scroll-map-in-band self real-map avail-range array 2 (- elevator-thickness 3))))
          (t
           ;; There is a mixture of overlays and splits.
           (let* ((current-band-start 2)
                  (map-width  (compute-map-width elevator-thickness n-split-maps))
                  (band-inc   (+ map-width *map-spacing*)))
             (loop for m in map-order
                   for real-map = (get-named-scroll-map self m)
                   when real-map
                     do
                        (if (member m overlayed-maps)
                            (draw-scroll-map-in-band self real-map avail-range array 2 (- elevator-thickness 3))
                            (draw-scroll-map-in-band self real-map avail-range array
                                                     current-band-start (+ current-band-start map-width -1))
                            (incf current-band-start band-inc))
                   else do (incf current-band-start band-inc)))))))

(defmethod (Compute-BG-Image Attribute-mapped-scroll-bar) (window)
  ;; This draws a new version of the scroll bar background (i.e. the top, bottom, and shaft without the elevator car
  ;; into the bit array known as "image-cache", which is stored in an instance variable of the scroll bar.
  (ensure-image-cache self)
  (let ((orientation (orientation self))
        (end-size    elevator-thickness)
        (window-min  (range-min window-range))
        (window-max  (range-max window-range)))
    (labels ((rectangle (width height x y temp)
               (when (and (plusp width) (plusp height))
                 (ecase orientation
                   (:vertical   (%draw-rectangle width height x y boole-ior temp))
                   (:horizontal (%draw-rectangle height width y x boole-ior temp)))))
             (bblt (width height x y pattern phase temp &optional (alu boole-ior))
               (when (and (plusp width) (plusp height))
                 (ecase orientation
                   (:vertical   (bitblt alu width height pattern 0 phase temp x y))
                   (:horizontal (bitblt alu height width pattern phase 0 temp y x)))))
             (a-box (begin end edge-thickness fill-pattern fill-phase temp)
               (rectangle elevator-thickness edge-thickness 0 begin temp)
               (rectangle elevator-thickness edge-thickness 0 (- end edge-thickness) temp)
               (rectangle edge-thickness (- (- end begin) (* edge-thickness 2)) 0 (+ begin edge-thickness) temp)
               (rectangle edge-thickness (- (- end begin) (* edge-thickness 2)) (- (+ 0 elevator-thickness) edge-thickness) (+ begin edge-thickness) temp)
               (when fill-pattern
                 (bblt (- elevator-thickness (* edge-thickness 2)) (- (- end begin) (* edge-thickness 2))
                       (+ 0 edge-thickness) (+ begin edge-thickness) fill-pattern (+ fill-phase edge-thickness) temp)))
             (draw-cable (begin end phase temp)
               (let ((shaft-gray *black-pattern*))
                 (bblt *elevator-cable-thickness* (- end begin) 0 begin shaft-gray phase temp)
                 (bblt *elevator-cable-thickness* (- end begin) (1- elevator-thickness) begin shaft-gray phase temp)
                 (bblt (- elevator-thickness *elevator-cable-thickness* *elevator-cable-thickness*) (- end begin)
                       1 begin
                       *elevator-shaft-gray* phase temp))))
      ;; Clear the whole thing
      (bblt elevator-thickness (- window-max window-min) 0 0 *white-pattern* 0 image-cache tv:alu-seta)
      ;; === 1. Draw the top and bottom targets
      (a-box 0 end-size *elevator-box-thickness* *elevator-end-gray* 0 image-cache)
      (a-box (- (- window-max window-min) end-size) (- window-max window-min)
             *elevator-box-thickness* *elevator-end-gray* 0 image-cache)
      ;; === 2. Draw the cables
      (draw-cable end-size (- (- window-max window-min) end-size) 0 image-cache)
```

```
    (multiple-value-bind (nil nil min-avail max-avail) (send window :y-scroll-position)
      (draw-scroll-maps-on-array self (- max-avail min-avail) image-cache))
    ;;
    ;; image tick is T if the bg image has "never" been drawn, and NIL if it has even ever been drawn once.
    ;; This is to help avoid the problem of existing scroll bars not knowing about the bg-image-cache.
    ;;
    (setf image-tick nil))))

(defmethod (Redraw-Elevator-Special Attribute-mapped-scroll-bar) (window force &aux (orientation (orientation self)))
  (tv:prepare-sheet (window)
    (multiple-value-bind (l tp) (margin-component-edges self window)
      (multiple-value-bind (min-vis total-vis min-avail max-avail) (ecase orientation
                                                                    (:horizontal (send window :x-scroll-position))
                                                                    (:vertical   (send window :y-scroll-position)))
        (let* ((displayed-min (range-min displayed-range))
               (displayed-max (range-max displayed-range))
               (window-min    (range-min window-range))
               (window-max    (range-max window-range))
               (height        (range-size window-range))
               (width         elevator-thickness)
               (max-vis       (+ min-vis total-vis))
               (end-size      elevator-thickness)
               (left          (+ l shaft-whitespace-thickness))
               (top           (+ tp shaft-whitespace-thickness)))
          (multiple-value-bind (elevator-min elevator-max)
              (stack-let* ((available-range (make-range min-avail max-avail))
                           (visible-range   (make-range min-vis max-vis))
                           (shaft-range     (make-range (min (+ window-min end-size) window-max)
                                                        (max (- window-max end-size) window-min))))
                (compute-scroll-bar-ends available-range visible-range shaft-range))
            ;; -- Return immediately if no change.
            (when (and (eql elevator-min displayed-min) (eql elevator-max displayed-max) (not force))
              (return-from redraw-elevator-special))
            ;; -- Draw the main body of the elevator:
            (cond (force
                   ;; Draw the whole thing when forced.
                   (ecase orientation
                     (:vertical   (tv:sheet-draw-1-bit-raster width height image-cache 0 0 nil left window-min
                                     tv:alu-seta tv:alu-setz window))
                     (:horizontal (tv:sheet-draw-1-bit-raster height width image-cache 0 0 nil window-min top
                                     tv:alu-seta tv:alu-setz window)))
                   (setf cable-drawn t))
                  (t
                   (ecase orientation
                     (:vertical (tv:sheet-bitblt tv:alu-seta width (range-size displayed-range) image-cache
                                   0 (- (range-min displayed-range) window-min) nil
                                   left (range-min displayed-range) window))
                     (:horizontal (tv:sheet-bitblt tv:alu-seta (range-size displayed-range) width image-cache
                                   (- (range-min displayed-range) window-min) 0
                                   nil (range-min displayed-range) top window))
                     )))
            ;; -- Draw the elevator car:
            (alter-range displayed-range elevator-min elevator-max)
            (ecase orientation
              (:vertical
               ;; left, right, top, bottom
               (tv:sheet-draw-line (1+ left) elevator-min (+ left width -1) elevator-min tv:alu-seta t window)
               (tv:sheet-draw-line (1+ left) (1- elevator-max) (+ left width -1) (1- elevator-max) tv:alu-seta t window)
               (tv:sheet-bitblt tv:alu-ior (- width 2) (- elevator-max elevator-min 2)
                                *elevator-car-gray* 0 0
                                nil (1+ left) (1+ elevator-min) window))
              (:horizontal
               (tv:sheet-draw-line elevator-min (1+ top) elevator-min (+ top width -1) tv:alu-seta t window)
               (tv:sheet-draw-line (1- elevator-max) (1+ top) (1- elevator-max) (+ top width -1) tv:alu-seta t window)
               (tv:sheet-bitblt tv:alu-ior (- elevator-max elevator-min 2) (- width 2)
                                *elevator-car-gray* 0 0
                                nil (1+ elevator-min) (1+ top) window))
              )))))))

(Defmethod (Draw-Elevator-If-Needed Attribute-Mapped-Scroll-Bar) (Window Alu Force)
  (declare (ignore alu))
  (let ((message (ecase (orientation self)
                   (:horizontal :x-scroll-position)
                   (:vertical   :y-scroll-position))))
    (multiple-value-bind (min-vis tot-vis min-avail max-avail) (send window message)
      (stack-let ((vis     (make-range min-vis (+ min-vis tot-vis)))
```

```
                                  (avail (make-range min-avail max-avail)))
              (cond ((range-equal vis avail)
                      (margin-component-erase self window)
                      (setf cable-drawn nil))
                    (t
                      (redraw-elevator-special self window
                                               (or force (null cable-drawn) image-tick
                                                   (null (range-min displayed-range)))))))))))

(defmethod (Draw-Elevator-If-Requested Attribute-mapped-scroll-bar) (window alu force)
  (declare (ignore alu))
  (redraw-elevator-special self window (or force (null cable-drawn) image-tick (null (range-min displayed
-range)))))

(defmethod (Margin-Scroll-Bar-Draw-Elevator Attribute-Mapped-Scroll-Bar) (window alu &optional force)
  ;; The main interface to the rest of the Symbolics window system manager is this function.
  ;; It is called from the operating system when the operating system has determined that the
  ;; scroll bar ought to be drawn.
  (unless (eq visibility :suppressed)
    ;; If we somehow escaped initialization, clean up
    (unless (and (range-min window-range) (range-max window-range))
      (margin-component-after-redefine-margins-kludge self window))
    (ensure-image-cache self)
    ;; Draw the scroll bar, supressing display if it blows out.
    (let-if (eq (cli::follow-synonym-stream *debug-io*) window)
            ((*debug-io* "Error drawing scroll bar"))
      (unless (catch-error-restart (error "Suppress the scroll bar entirely")
                (catch-error-restart (abort "Skip drawing the scroll bar")
                  ;; Main body
                  (ecase visibility
                    ((:normal :temporary-normal)
                     (when image-tick (compute-bg-image self window))
                     (redraw-elevator-special self window
                                              (or force (null cable-drawn)
                                                  image-tick
                                                  (null (range-min displayed-range)))))
                    (:if-requested
                     (when image-tick (compute-bg-image self window))
                     (draw-elevator-if-requested self window alu force))
                    (:if-needed
                     (when image-tick (compute-bg-image self window))
                     (draw-elevator-if-needed self window alu force)))
                  T))
        (setq visibility :suppressed)))))

(Defmethod (Margin-Component-Change-Of-Size-Or-Margins Attribute-Mapped-Scroll-Bar :After) (Window)
  (declare (ignore window))
  ;; This method is called whenever the window has been reshaped by the user. The primary
  ;; method is implemented by dw:margin-scroll-bar, but this :after demon causes the new instance
  ;; variables for a attribute-mapped-scroll-bar to also be reset, causing the scroll bar's image to
  ;; be recomputed from scratch.
  (setf image-cache nil       ; clear the cache, forcing a new bit-array to be allocated
        image-tick t)         ; set the flag that says "redraw the image in the cache."
  displayed-range)
;;;
;;; ------------------------------------------------------------------
;;; -- window-level interface ----------------------------------------
;;; ---- This code is the way to tell windows with dw:margin-mixin  --
;;; ---- how to add and remove scroll maps to the scroll bars in    --
;;; ---- various margin (i.e. :left :top :right :bottom). It is the --
;;; ---- highest level of functional abstracttion for this code     --
;;; ------------------------------------------------------------------
;;; ------------------------------------------------------------------
;;;
(defmethod (Scroll-Bar-In-Margin Dw:Margin-Mixin) (margin)
  (dolist (component dw::margin-components)
    (when (and (typep component 'Attribute-mapped-scroll-bar)
               (or (eq (dw::margin-scroll-bar-margin component) margin)
                   (and (eq (dw::margin-scroll-bar-margin component) :default)
                        (eq *default-scroll-bar-margin* margin))))
      (return component))))

(defmethod (Get-Named-Scroll-Map-In-Margin Dw:Margin-Mixin) (margin name &aux s)
  ;; Returns a scroll map if:
  ;; a) a scroll bar exists in the margin specified
  ;; b) it has a scroll bar map of the proper name
  (and (setf s (scroll-bar-in-margin self margin))
       (get-named-scroll-map s name)))

(defmethod (Set-Named-Scroll-Map-In-Margin Dw:Margin-Mixin) (margin name map &aux s)
  (if (setf s (scroll-bar-in-margin self margin))
      (set-named-scroll-map s name map t)
      (cerror "There is no scroll bar in the ~s margin." margin)))

(defmethod (Set-Scroll-Map-Order-In-Margin Dw:Margin-Mixin) (margin list-of-names &aux s)
  (if (setf s (scroll-bar-in-margin self margin))
      (set-map-order s list-of-names)
```

```
(cerror "Skip defining these scroll map names and continue." "There is no scroll bar in the ~s marg
in." margin)))

(defmethod (Redraw-Scroll-Map-In-Margin Dw:Margin-Mixin) (margin &aux s)
  (When (Setf S (Scroll-Bar-In-Margin Self Margin))
    (Compute-Bg-Image S Self)
    (Margin-Component-Draw S Self Tv:Alu-Seta)))
```

What is claimed is:

1. In an interactive data display computer system including a processing unit for processing data, a memory for storing a data file, and a data display screen for displaying data to a user, said data display screen including a data display field in a first region and a scroll bar field in a second region separated form said first region, a method of presenting a user with an attribute-enhanced scroll bar comprising:
   display in said data display field a portion of some but not all of said data file;
   displaying in said scroll bar field a shaft representing a length of said data file;
   displaying in said scroll bar field a car within said shaft representing a position of said portion relative to said length; and
   displaying in said scroll bar field an attribute map within said shaft comprising indicia representing a position of each occurrence of selected data in said data field relative to said length, said attribute map being visually distinguishable from said car.

2. The method of claim 1, wherein said indicia further indicate a relative size of said selected data relative to said length.

3. The method of claim 1, wherein said shaft is rectangularly-shaped and positioned lengthwise between a vertical edge of said data display screen and a vertical edge of said data display field, and said shaft represents an entire vertical length of said data file.

4. The method of claim 3, wherein said shaft is positioned adjacent to said vertical edges.

5. The method of claim 3, further comprising:
   displaying in said scroll bar field a second shaft wherein said second shaft is rectangularly-shaped and positioned lengthwise between a horizontal edge of said data display screen and a horizontal edge of said data display field, and said second shaft represents an entire horizontal length of said data file; displaying in said scroll bar field a second car within said second shaft representing a position of said portion relative to said entire horizontal length; and
   displaying in said scroll bar field a second attribute map within said second shaft comprising second indicia representing a position of each occurrence of said selected data in said data file relative to said entire horizontal length, said second attribute map being visually distinguishable from said second car.

6. The method of claim 1, further comprising:
   a second attribute map within said shaft comprising second indicia representing a position of each occurrence of a second selected data in said data file relative to said length, said second attribute map being visually distinguishable from said car, and said second selected data being distinct from said selected data.

7. The method of claim 6, wherein said indicia and said second indicia are visually distinguishable form one another.

8. The method of claim 7, wherein said indicia and said second indicia are different shapes.

9. The method of claim 7, wherein said indicia and said second indicia are different colors.

10. The method of claim 7, wherein said indicia and said second indicia are different shades.

11. The method of claim 6, wherein said indicia and said second indicia are positioned in separate spaced regions of said shaft.

12. The method of claim 6, wherein said indicia further indicate a relative size of said selected data relative to said length, and said second indicia further indicate a relative size of said second selected data relative to said length.

13. A computer display unit comprising:
   a central processing unit;
   a memory accessed by the central processing unit;
   a display screen which receives data from the central processing unit;
   means for displaying a data display field in a first region of said display screen and a scroll bar field in a second region of said display screen separated from said first region;
   means for displaying in said data display field a portion containing some but not all of a data file stored in said memory;
   means for displaying in said scroll bar field a shaft representing a length of said data file;
   means for displaying in said scroll bar field a car within said shaft representing a position and size of said portion relative to said length; and
   means for displaying in said scroll bar field an attribute map within said shaft comprising indicia representing a position of each occurrence of selected data in said data file relative to said length, said attribute map being visually distinguishable from said car.

14. In an interactive data display computer system including a processing unit for processing data, a memory for storing a data file, and a data display screen for displaying data to a user, said data display screen providing in separate regions a data display field and a scroll bar field, a method of visually presenting a user with an attribute-enhanced scroll bar comprising the steps of:
   displaying within said data display field a portion of said data file containing some but not all of said data file; and
   displaying within said scroll bar field;
   (i) a shaft representing a length of said data file, said length of said data file exceeding said displayed portion of said data file;
   (ii) a car within said shaft wherein a spatial relationship between said car and said shaft visually indicates to said user a relative size and position of said displayed portion of said data file with respect to said length of said data file; and
   (iii) an attribute map within said shaft visually distinguishable from said car wherein a spatial relationship between said attribute map and said shaft visually indicates to said user a position of each occurrence of selected information in said data file with respect to said length of said data file.

15. The method of claim 14, wherein said shaft is rectangularly-shaped and positioned lengthwise between a horizontal edge of said data display screen and a horizontal edge of said data display field, and said shaft represents a entire horizontal length of said data file.

16. The method of claim 14, wherein said shaft is rectangularly-shaped positioned lengthwise between a vertical edge of said data display screen and a vertical edge of said data display field, and said shaft represents a entire vertical length of said data file.

17. The method of claim 14, further comprising a second attribute map within said shaft visually distinguishable form said attribute map and said car wherein a spatial relationship between said second attribute map and said shaft visually indicates to said user a position of each occurrence of second selected information in said data file with respect to said length of said data file, wherein said selected information is distinct from said second selected information, and said attribute map is displayed simultaneously with said second attribute map.

18. The method of claim 17 wherein said data display screen displays said attribute maps with different shapes and said attribute maps are visually distinguishable by having different shapes.

19. The method of claim 17 wherein said data display screen displays said attribute maps with different colors and said attribute maps are visually distinguishable by having different colors.

20. The method of claim 17 wherein said data display screen displays said attribute maps with different shades and said attribute maps are visually distinguishable by having different shades.

21. The method of claim 17 wherein said data display screen displays said attribute maps in separate spaced regions of said shaft and said attribute maps are visually distinguishable by being positioned in separate spaced regions of said shaft.

22. The method of claim 14 wherein said selected information in said data file consists of portions of a document.

23. The method of claim 14 wherein said selected information in said data file consists of character strings.

24. The method of claim 14 wherein said shaft and said car are rectangularly-shaped.

25. The method of claim 14 wherein said length of said data file exceeds a displayed length of said displayed portion of said data file.

26. The method of claim 14 wherein said data display field and said scroll bar field occupy adjacent non-overlapping regions on said data display screen.

27. The method of claim 14, further comprising displaying in said scroll bar field:
   (iv) a second shaft representing a second length of said data file, said shaft and said second shaft occupying separate non-overlapping regions in said scroll bar field, said second length of said data file exceeding a corresponding length of said displayed portion of said data file;
   (v) a second car within said second shaft wherein a spatial relationship between said second car and said second shaft visually indicates to said user a relative size and position of said displayed portion of said data file with respect to said second length of said data file; and
   (vi) a second attribute map within said second shaft visually distinguishable from said second scroll bar wherein a spatial relationship between said second attribute map and said second shaft visually indicates to said user a position of each occurrence of said selected information in said data file with respect to said second length of said data file.

28. The method of claim 27 wherein said shaft and said second shaft are positioned orthogonal to one another.

29. The method of claim 28 wherein said shaft represents an entire horizontal length of said data file, and said second shaft represents an entire vertical length of said data file.

30. The method of claim 14 wherein said user selects said selected information in said data file.

31. The method of claim 14 wherein said user selects an appearance of said attribute map without affecting an ability of said attribute map to visually indicate to said user the position of each occurrence of said selected information in said data file with respect to said length of said data file.

32. The method of claim 31 wherein said apparatus of said attribute map is shape, color, shade, or combinations thereof.

33. The method of claim 14 wherein said attribute map further indicates a relative size of each occurrence of said selected information in said data file with respect to said length of said data file.

34. The method of claim 14 wherein said length of said data file is one of vertical or horizontal length, and said attribute map only indicates the position of said selected information in said data file with respect to said one of vertical or horizontal length of said data file.

* * * * *